United States Patent
Kaminosono

(10) Patent No.: US 8,120,714 B2
(45) Date of Patent: *Feb. 21, 2012

(54) FLAT DISPLAY DEVICE

(75) Inventor: Takeshi Kaminosono, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1056 days.

This patent is subject to a terminal disclaimer.

(21) Appl. No.: 12/068,084

(22) Filed: Feb. 1, 2008

(65) Prior Publication Data

US 2008/0186416 A1    Aug. 7, 2008

(30) Foreign Application Priority Data

Feb. 2, 2007  (JP) ................................ 2007-024728

(51) Int. Cl.
*H04N 5/64* (2006.01)
(52) U.S. Cl. ........................................ 348/836; 348/837
(58) Field of Classification Search .................. 248/371; 348/836, 837, 838
See application file for complete search history.

(56) References Cited

U.S. PATENT DOCUMENTS

| 4,796,842 | A |   | 1/1989 | Hamada et al. | ............... | 248/186 |
| 4,905,543 | A | * | 3/1990 | Choi | ............................. | 74/827 |
| 6,334,599 | B1 | * | 1/2002 | Jeong | ............................. | 248/371 |

FOREIGN PATENT DOCUMENTS

| EP | 1 722 560 A2 | 11/2006 |
| EP | 1 816 389 A1 | 8/2007 |
| GB | 2 071 939 A | 9/1981 |
| JP | 63-124775 U | 8/1988 |
| JP | 03-42186 U | 4/1991 |
| JP | 04-061575 | 2/1992 |
| JP | 2004-304679 | 10/2004 |
| WO | WO 03/077322 A2 | 9/2003 |

OTHER PUBLICATIONS

*When Does Motor "Soft Starting" Make Sense?*, Smart Energy User, P.E.I. Department of Economic Development and Tourism, Feb. 1997, vol. 3, Issue 3, two pages.

* cited by examiner

*Primary Examiner* — Basil Katcheves
(74) *Attorney, Agent, or Firm* — Morgan, Lewis & Bockius LLP

(57) ABSTRACT

A flat display device includes a display unit, a pedestal part for supporting the display unit, a joint part for connecting the pedestal part with the display unit, a rotation drive mechanism provided to the joint part for rotating the display unit in the horizontal direction, a motor for giving a rotation force to the rotation drive mechanism, a motor driver for driving the motor by supplying an operating voltage to the motor, and an operating voltage control portion for controlling the operating voltage. The operating voltage control portion performs the control so that the operating voltage is increased gradually when the driving of the rotation drive mechanism is started while the operating voltage is decreased gradually when the driving of the rotation drive mechanism is stopped. The motor generate a torque corresponding to the operating voltage. When the driving of the rotation drive mechanism is started or stopped, the torque of the motor is changed gradually so that acceleration and deceleration of the rotation speed is performed mildly.

7 Claims, 3 Drawing Sheets

FLAT DISPLAY DEVICE

CROSS-REFERENCE TO RELATED APPLICATIONS

This application is based on Japanese Patent Application No. 2007-024728 filed on Feb. 2, 2007, the contents of which are hereby incorporated by reference.

BACKGROUND OF THE INVENTION

1. Field of the Invention

The present invention relates to a flat display device having a thin display unit of a liquid crystal display type, a plasma display type, a rear projection display type or other display type. In particular, the present invention relates to a flat display device equipped with a rotation drive mechanism for rotating the display unit in the horizontal direction.

2. Description of Related Art

Conventionally, there is a display device equipped with a rotation drive mechanism for driving the display unit that displays reproduced pictures, in the horizontal direction by transmitting a driving force of a motor. Some examples of the rotation drive mechanism for a display device having a CRT as the display unit are disclosed in Japanese Utility Model No. 63-124775-A (a first document), Japanese Utility Model No. 03-042186-A (a second document), and JP-A-H04-061575 (a third document), for example.

In addition, as disclosed in JP-A-2004-304679 (a fourth document) for example, there is another example of the rotation drive mechanism for a flat display device having a thin display unit of a liquid crystal display type, a plasma display type, a rear projection display type or other display type.

According to the second document, the rotation drive mechanism has a structure in which an electromagnetic clutch is used and controlled in accordance with a load current of a drive motor under operation so that the rotation operation is stopped or controlled appropriately when the display unit touches an obstacle during the rotation operation. More specifically, when display unit touches an obstacle, the load current of the drive motor increases. Then, the contact between the display unit and the obstacle is detected from the load current, and the electromagnetic clutch is disconnected so that the rotation of the display unit is stopped.

According to the third document, the rotation drive mechanism uses a stepping motor that can obtain low rotation speed and high torque so as to secure a torque necessary for rotating a large display device instead of using a small DC motor having small torque and a power transmission gear having a high gear ratio. Since the stepping motor is used, the gear ratio of the power transmission gear can be reduced so that a structure thereof can be simplified. Thus, a structure of the rotation drive mechanism can be simplified.

According to the fourth document, the rotation drive mechanism includes a stepping motor, and a display unit of a flat display device can be rotated in the horizontal direction as well as in the tilt direction.

If the above-mentioned rotation drive mechanism is used for a flat display device, and if the flat display device is placed on a floor or the like, the entire device may be swayed when the rotation drive mechanism drives the display unit in the horizontal direction at a start or a stop operation of the rotation because of a high position of a barycenter of the device. In particular, the display unit may be swayed largely when the rotation drive mechanism stops the display unit just after starting the rotation thereof in the horizontal direction.

This swaying may be caused by an influence of inertia or the like, and the above-mentioned third document teaches a method for preventing the swaying mechanically by disposing a flat spring in a gap at a periphery of an upper portion of a rotation shaft. However, there is a limitation in preventing the swaying that occurs in the display unit by the mechanical method.

SUMMARY OF THE INVENTION

An object of the present invention is to prevent a flat display device that can suppress swaying of a display unit when it is rotated by a rotation drive mechanism, by controlling the rotation by a motor.

A flat display device according to an embodiment of the present invention includes a display unit having a screen for displaying images, a pedestal part for supporting the display unit, a joint part for connecting the pedestal part with the display unit, a rotation drive mechanism provided to the joint part for rotating the display unit in the horizontal direction, a motor for giving a rotation force to the rotation drive mechanism, a motor driver for driving the motor by supplying an operating voltage to the motor, and an operating voltage control portion for controlling the operating voltage. The operating voltage control portion performs the control so that the operating voltage is increased gradually when the driving of the rotation drive mechanism is started while the operating voltage is decreased gradually when the driving of the rotation drive mechanism is stopped, and the motor generate a torque corresponding to the operating voltage.

According to this structure, the operating voltage to be supplied to the motor is changed gradually so that the torque of the motor can be changed gradually when the driving of the rotation drive mechanism is started or stopped. Therefore, the rotation speed thereof can be accelerated or decelerated gradually. Thus, a reaction that is generated when the rotation drive mechanism rotates the display unit is suppressed so that the swaying thereof can be reduced.

Further, as to the structure described above, the flat display device may further include an infrared reception part for receiving an infrared signal from a remote controller that issues an instruction of an operation to the flat display device by using the infrared signal, and the start and the stop of driving the rotation drive mechanism is performed in accordance with the infrared signal. According to this structure, operations for controlling the rotation drive mechanism can be performed by using the remote controller.

Further, more specifically as to the structure described above, the operating voltage control portion generates a voltage switching signal for changing the operating voltage and controls the operating voltage by using the voltage switching signal.

Further, more specifically as to the structure described above, the operating voltage changes in accordance with a value of a bias voltage that is supplied from the operating voltage control portion to the motor driver, and the operating voltage control portion controls the operating voltage by controlling the value of the bias voltage.

Further, as to the structure described above, the operating voltage control portion includes an integrator circuit and supplies the bias voltage to the motor driver by using the integrator circuit.

According to this structure, it becomes easy to increase or decrease the bias voltage gradually since characteristics of the integrator circuit is utilized. Therefore, it becomes easy to increase the operating voltage gradually or to decrease the same gradually.

Further, more specifically as to the structure described above, the motor driver includes a control terminal and changes the operating voltage in accordance with a signal that is supplied to the control terminal, and the operating voltage control portion controls the operating voltage by controlling the signal that is delivered to the control terminal.

Further, more specifically as to the structure described above, the operating voltage control portion includes a digital to analog conversion circuit and converts a digital signal for instructing the operating voltage into an analog signal by the digital to analog conversion circuit, which is supplied to the motor driver.

Further, more specifically as to the structure described above, the flat display device further includes a signal conversion circuit for converting the infrared signal received by the infrared reception part into a control signal, and a main control portion for analyzing the control signal so as to recognize that the remote controller has issued the instruction to start or stop the driving of the rotation drive mechanism.

In addition, a flat display device according to another embodiment of the present invention includes a display unit having a screen for displaying images, a pedestal part for supporting the display unit, a joint part for connecting the pedestal part with the display unit, a rotation drive mechanism provided to the joint part for rotating the display unit in the horizontal direction, a motor for giving a rotation force to the rotation drive mechanism, an infrared reception part for receiving an infrared signal instructing a drive of the rotation drive mechanism from a remote controller that instructs an operation, a signal converting portion for converting the infrared signal received by the infrared reception part into a control signal, a main control portion for analyzing the control signal sent from the signal converting portion so as to confirm contents of the instruction, a motor driver for receiving a signal from the main control portion and for supplying an operating voltage to the motor so as to drive the motor, and an operating voltage control portion for receiving a signal from the main control portion and for generating a voltage switching signal for changing the operating voltage. The operating voltage control portion increases the operating voltage gradually by generating the voltage switching signal when the main control portion recognizes that the driving of the rotation drive mechanism should be started based on the control signal, while it decreases the operating voltage gradually by generating the voltage switching signal when the main control portion recognizes that the driving of the rotation drive mechanism should be stopped based on the control signal.

BRIEF DESCRIPTION OF THE DRAWINGS

The above-mentioned object and other objects as well as features of the present invention will be more clear by the following description of the preferred embodiments and the attached drawing.

DETAILED DESCRIPTION OF THE PREFERRED EMBODIMENTS

Figure 1:
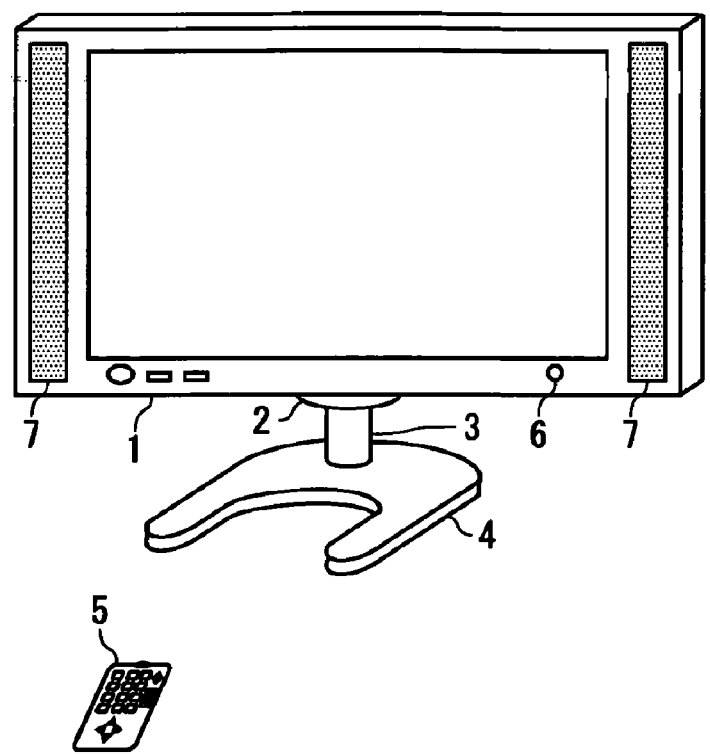
FIG. 1 is a general perspective view showing an appearance structure of a flat television set according to an embodiment of the present invention.
Figure 3:
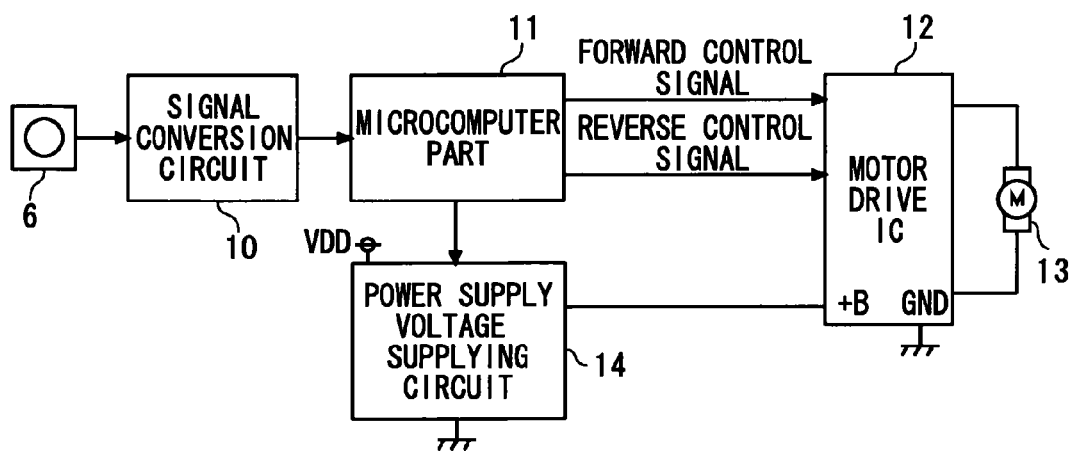
FIG. 3 is a block diagram showing a structure of a rotation drive mechanism of the flat television set shown in FIG. 1.

A flat television set as a flat display device according to an embodiment of the present invention will be described with reference to the attached drawings. FIG. 1 is a general perspective view showing an appearance structure of the flat television set according to the embodiment. FIG. 3 is a block diagram showing a structure of a rotation drive mechanism of the flat television set shown in FIG. 1.

As shown in FIG. 1, the flat television set of the embodiment includes a display unit 1 having a screen for displaying reproduced pictures, a support part 2 that is connected to the middle of a bottom side of the rear that is the opposite to the screen of the display unit 1, a driving part 3 having a rotating drive shaft that is connected to the support part 2 for driving the same in the horizontal direction, and a pedestal 4 on which the driving part 3 is disposed.

In other words, the driving part 3 is disposed on the middle of the upper side of the pedestal 4 so that the axial direction of the driving part 3 becomes perpendicular to the horizontal direction, and the support part 2 is connected to the driving part 3 at the position opposite to the pedestal 4. Then, the support part 2 is connected to the rear of the display unit 1, so that the pedestal 4 having a large footprint can support the flat television set not to topple.

In addition, although they are not shown in the drawings, a shaft that rotates around the vertical axis, a motor for rotating the shaft and a transmission mechanism such as gears for transmitting a driving force from a motor are disposed in the driving part 3, which constitute the rotation drive mechanism.

In other words, when this rotation drive mechanism disposed in the driving part 3 operates, the display unit 1 can be rotated in the horizontal direction. Note that the driving part 3 may also have a tilt mechanism for tilting the display unit 1 in the vertical direction (a tilt direction) that is substantially perpendicular to the horizontal direction.

In addition, the flat television set having the structure described above can be controlled by a remote controller 5 that transmits the infrared signal for instructing operations of the flat television set. The flat television set has an infrared reception part 6 on the front of the display unit 1 where the screen is disposed, so as to receive an infrared signal from the remote controller 5.

When the remote controller 5 is operated, instruction contents of the infrared signal transmitted from the remote controller 5 is recognized by a microcomputer inside the flat television set. Then, in accordance with a result of analyzing the infrared signal received by the infrared reception part 6, a tuning operation by a tuner circuit (not shown) inside the flat television set, a volume change of a speaker 7, the rotation drive operation of the driving part 3 for the display unit 1 (start and stop of the rotation drive) and the like are controlled.

Figure 2:
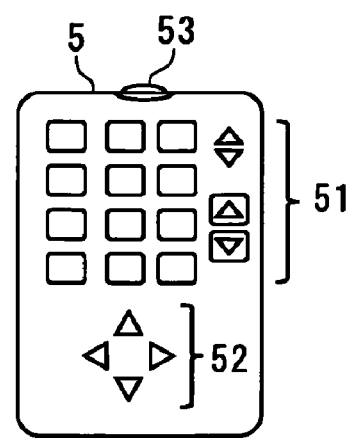
FIG. 2 is a schematic diagram showing a structure of a remote controller of the flat television set shown in FIG. 1.

In addition, as shown in FIG. 2, the remote controller 5 includes channel buttons 51 for selecting a channel to be received, drive instruction buttons 52 for driving the display unit 1 in the horizontal direction or in the tilt direction, an infrared transmission part 53 for transmitting an infrared signal corresponding to a button that is pressed. When one of the drive instruction buttons 52 is held in the pressed state, the driving part 3 works so that the display unit 1 is driven in the direction corresponding to the button that is pressed.

The rotation drive mechanism of the flat television set having the structure described above will be described with reference to the block diagram of FIG. 3.

The rotation drive mechanism shown in FIG. 3 includes a signal conversion circuit 10 for demodulating a signal from the infrared reception part 6 receiving the infrared signal from the remote controller 5 as a signal conversion, a microcomputer part 11 for analyzing a control signal from the signal conversion circuit 10, a motor drive IC 12 that is controlled by the microcomputer part 11, a motor 13 that is driven by the motor drive IC 12, a power supply voltage supplying circuit 14 for supplying a power supply voltage to the motor drive IC 12.

The microcomputer part 11 delivers a forward control signal for driving the motor 13 to rotate normally and a reverse control signal for driving the motor 13 to rotate reversely to the motor drive IC 12. When the motor drive IC 12 receives the forward control signal and the reverse control signal, the motor 13 is driven by the motor drive IC so that the rotation drive mechanism of the driving part 3 works to rotate the display unity in the horizontal direction.

In addition, the motor drive IC 12 includes an inverter circuit (not shown) that is connected to a motor coil of the motor 13. When the forward control signal or the reverse control signal is supplied to a control terminal of a transistor switch that constitutes the inverter circuit (not shown), a state of forward rotation or reverse rotation is set for the motor 13.

In addition, the motor drive IC 12 is provided with a ground terminal (the reference symbol GND in FIG. 3) for connecting the inverter circuit (not shown) to the ground and a voltage supply terminal to which the power supply voltage is supplied (the reference symbol +B in FIG. 3). The ground terminal is connected to the ground, and the voltage delivered from the power supply voltage supplying circuit 14 is supplied to the voltage supply terminal, so that the inverter circuit (not shown) is biased.

In addition, a value of the output voltage from the power supply voltage supplying circuit 14 is switched by the control signal from the microcomputer part 11 and is supplied to the voltage supply terminal of the motor drive IC 12. A torque of the motor 13 is changed by the voltage value that is supplied to the voltage supply terminal of the motor drive IC 12. More specifically, the torque of the motor 13 is increased when the output voltage from the power supply voltage supplying circuit 14 is high.

Figure 4:
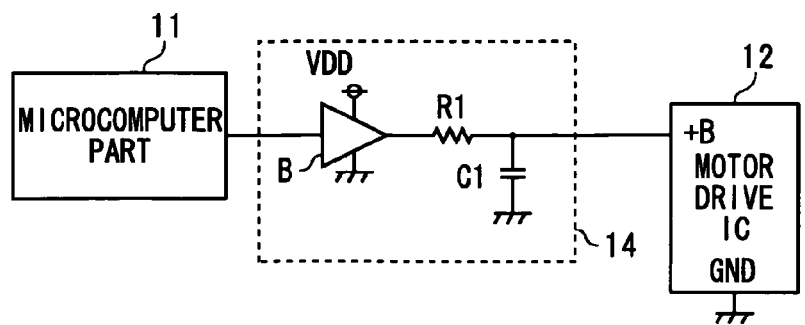
FIG. 4 is a block diagram showing a structure of a power supply voltage supplying circuit of the rotation drive mechanism shown in FIG. 3.

An example of a structure of the power supply voltage supplying circuit 14 will be described with reference to a circuit diagram shown in FIG. 4. As shown in FIG. 4, the power supply voltage supplying circuit 14 includes a buffer B that converts the control signal from the microcomputer part 11 into a binary voltage signal between a DC voltage VDD and the ground voltage, a resistor R1 having an end connected to the output terminal of the buffer B, and a capacitor C1 having an end connected to the other end of the resistor R1 and the other end connected to the ground. Furthermore, a connection node between the resistor R1 and the capacitor C1 that constitute an integrator circuit is connected to the voltage supply terminal of the motor drive IC 12.

According to this structure, the DC voltage VDD is delivered from the buffer B and is applied to the resistor R1 when the control signal from the microcomputer part 11 becomes a high level. Thus, while a charging operation of the capacitor C1 is performed in the integrator circuit, the voltage at the connection node between the resistor R1 and the capacitor C1 increases gradually to be close to the DC voltage VDD.

On the contrary, the ground voltage is delivered from the buffer B and is applied to the resistor R1 when the control signal from the microcomputer part 11 becomes a low level. Thus, while a discharging operation of the capacitor C1 is performed in the integrator circuit, the voltage at the connection node between the resistor R1 and the capacitor C1 decreases gradually to be close to the ground voltage.

An operation of the rotation drive mechanism including the power supply voltage supplying circuit 14 will be described with reference to the timing chart shown in FIG. 5. When the remote controller 5 is operated, the infrared signal corresponding to the operation is received by the infrared reception part 6. Then, the infrared signal received by the infrared reception part 6 is converted into an electric signal, which is supplied to the signal conversion circuit 10. The signal conversion circuit 10 demodulates the electric signal from the infrared reception part 6 as a signal conversion, and the signal after the signal conversion is supplied to the microcomputer part 11 so that the infrared signal from the remote controller 5 is analyzed.

Figure 5:
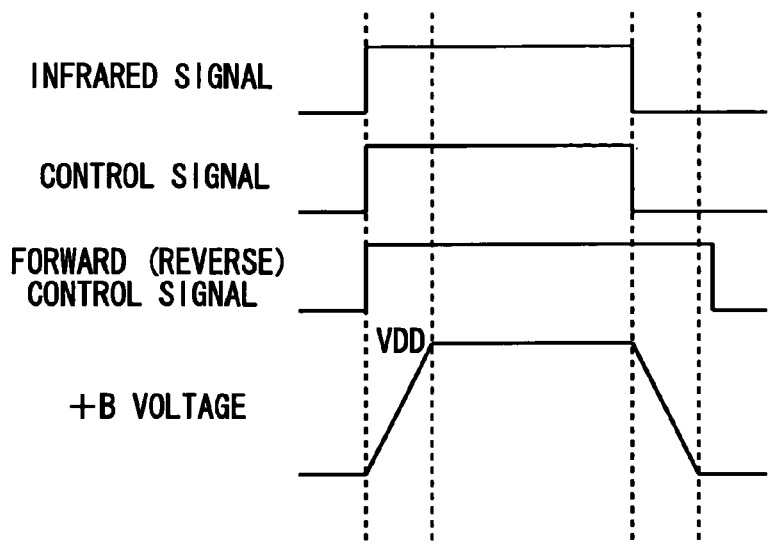
FIG. 5 is a timing chart showing a relationship between a change of a control signal from a remote controller and a change of a voltage value delivered from the power supply voltage supplying circuit shown in FIG. 4.

Therefore, as shown in FIG. 5, when the drive instruction buttons 52 of the remote controller 5 is pressed so as to send the infrared signal from the infrared transmission part 53 for instructing the normal rotation or the reverse rotation of the motor 13, the microcomputer part 11 analyzes the infrared signal from the remote controller 5 for recognizing the instruction of the normal rotation or the reverse rotation of the motor 13.

Then, the forward control signal or the reverse control signal for driving the motor 13 is delivered from the microcomputer part 11 to the motor drive IC 12. Thus, when the infrared signal is sent from the remote controller 5, the microcomputer part 11 starts to deliver the forward control signal or the reverse control signal. At the same time, the control signal supplied from the microcomputer part 11 to the power supply voltage supplying circuit 14 becomes the high level.

Thus, the control signal of the high level is supplied to the power supply voltage supplying circuit 14 from the microcomputer part 11 so that the DC voltage VDD is delivered from the buffer B. Therefore, the voltage that is supplied to the voltage supply terminal of the motor drive IC 12 from the connection node between the resistor R1 and the capacitor C1 increases gradually.

Therefore, an operating voltage of the motor 13 controlled by the motor drive IC 12 increases gradually, and the motor 13 rotates normally or reversely so that the display unit 1 is driven to rotate leftward or rightward in the horizontal direction. On this occasion, since the operating voltage of the motor 13 increases gradually, the torque of the motor 13 increases gradually so that the rotation speed of the motor 13 is accelerated.

After that, when the control signal is supplied that is the high level until a time period determined by the time constant of the capacitor C1 and the resistor R1 has passed, the voltage that is supplied from the connection node between resistor R1 and the capacitor C1 to the voltage supply terminal of the motor drive IC 12 becomes constant. Therefore, the motor rotates normally or reversely in the state where the operating voltage of the motor 13 controlled by the motor drive IC 12 is the maximum so that the torque of the motor 13 is also the maximum.

When the user stops to press the drive instruction buttons 52 of the remote controller 5 so as to stop the transmission of the infrared signal instructing the normal rotation or the reverse rotation from the infrared transmission part 53, the infrared reception part 6 becomes the state where the infrared signal cannot be received. Therefore, the microcomputer part 11 becomes the state where the signal input from the signal conversion circuit 10 cannot be detected. Thus, the microcomputer part 11 confirms that the rotation of the motor 13 should be stopped.

In this way, since the control signal supplied from the microcomputer part 11 to the power supply voltage supplying circuit 14 is switched to the low level, the buffer B delivers the ground voltage. Therefore, the voltage supplied from the connection node between resistor R1 and the capacitor C1 to the voltage supply terminal of the motor drive IC 12 decreases gradually. Thus, the operating voltage of the motor 13 controlled by the motor drive IC 12 decreases gradually, and the torque of the motor 13 decreases gradually in the normal rotation or the reverse rotation of the motor 13 so that the rotation speed of the motor 13 decreases gradually.

After that, when the time period determined by the time constant of the capacitor C1 and the resistor R1 has passed, the voltage supplied from the connection node between resistor R1 and the capacitor C1 to the voltage supply terminal of the motor drive IC 12 becomes the ground voltage. Therefore, the bias of the motor drive IC 12 becomes zero, and the rotation of the motor 13 and the display unit 11 stops finally. When the rotation stop of the motor 13 is confirmed in this way, the microcomputer part 11 stops to deliver the forward control signal and the reverse control signal.

Furthermore, it is possible to adopt the structure in which the microcomputer part 11 stops to deliver the forward control signal and the reverse control signal when the microcomputer part 11 confirms that a time period longer than the time period determined by the time constant of the capacitor C1 and the resistor R1 has passed after the rotation stop of the motor 13 is confirmed. Furthermore, it is possible to adopt the structure in which the microcomputer part 11 confirms that the voltage supplied from the power supply voltage supplying circuit 14 to the voltage supply terminal of the motor drive IC 12 has become the ground voltage so that the microcomputer part 11 stops to deliver the forward control signal and the reverse control signal.

In this way, according to the present embodiment, when the rotation operation of the display unit 1 is started, the bias voltage to be supplied to the motor drive IC 12 is increased gradually so that the operating voltage of the motor 13 controlled by the motor drive IC 12 changes to increase the torque of the motor 13 gradually, thereby the rotation speed thereof can be accelerated.

In addition, when the rotation operation of the display unit 1 is stopped, the bias voltage to be supplied to the motor drive IC 12 is decreased gradually so that the operating voltage of the motor 13 controlled by the motor drive IC 12 changes to decrease the torque of the motor 13 gradually, thereby the rotation speed thereof can be decreased. Thus, a reaction that is generated by the start or the stop of the rotation of the display unit 1 can be suppressed. In addition, when the rotation is stopped just after it is started, swaying thereof can be suppressed because the torque of the motor 13 is not strong.

Furthermore, the voltage value to be supplied to the voltage supply terminal of the motor drive IC 12 is changed so that the operating voltage and the torque or the rotation speed of the motor 13 are changed gradually in this embodiment. However, it is possible to adopt another structure in which a control terminal (CNT in FIG. 6) for switching the operating voltage for changing the torque of the motor 13 from the motor drive IC 12 is provided, and where the microcomputer part 11 switches a value of the control signal and delivers it to the control terminal as shown in FIG. 6.

In this case, a digital to analog conversion circuit (DAC circuit) 15 is provided for converting a digital signal delivered from the microcomputer part 11 into an analog signal since the signal to be supplied to the control terminal of the motor drive IC 12 is an analog signal of a voltage value or a current value. This DAC circuit 15 may be one that switches a digital signal to be a parallel signal from the microcomputer part 11 into an analog signal or one that that switches a digital signal to be a serial signal from the microcomputer part 11 into an analog signal.

In this structure, the microcomputer part 11 changes the gradation of the digital signal supplied to the DAC circuit 15 at a predetermined time interval by each gradation step, so as to change linearly a value of the analog signal converted by the DAC circuit 15. Thus, the operating voltage for changing the torque of the motor 13 can be changed gradually.

Figure 6:
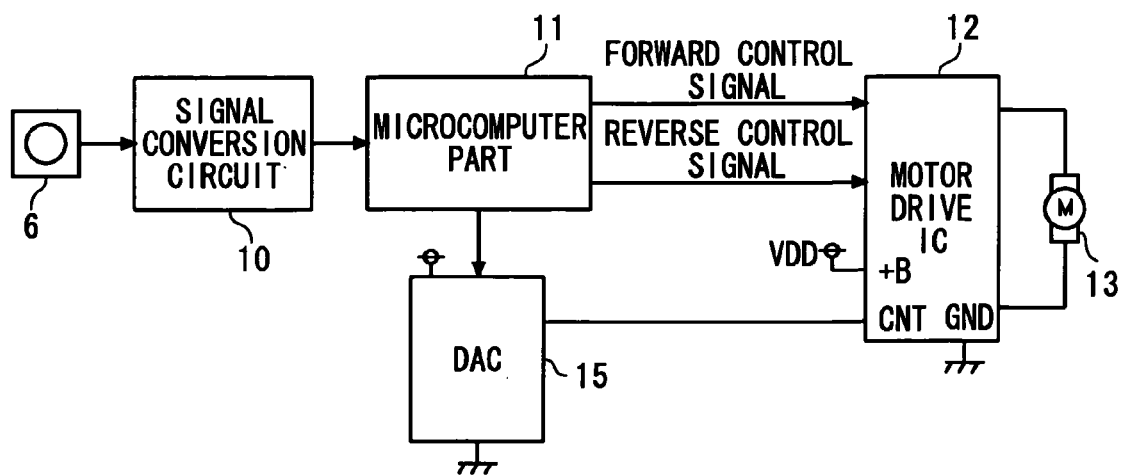
FIG. 6 is a block diagram showing another structure of the rotation drive mechanism of the flat television set shown in FIG. 1.

Further in the above description, the structure shown in FIGS. 3 and 4 is exemplified as changing the voltage value supplied to the voltage supply terminal of the motor drive IC 12 while the structure shown in FIG. 6 is exemplified as changing the signal supplied to the control terminal of the motor drive IC 12. However, it is possible to adopt another structure as long as the operating voltage of the motor drive IC 12 for the motor 13 is controlled to change gradually when the rotation of the motor 13 is started or stopped as shown in FIG. 5.

In addition, although the infrared signal is transmitted for instructing to drive the driving part 3 during the drive instruction buttons 52 of the remote controller 5 is pressed, it is possible to adopt another structure in which the transmission of the infrared signal is started by the first pressing, and the transmission of the infrared signal is stopped by the second pressing. In addition, it is possible to adopt another structure in which the infrared signal for instructing to start driving the driving part 3 and the infrared signal for instructing to stop driving the driving part 3 are transmitted when the driving or the stopping of the drive is instructed by the operation of the drive instruction buttons 52.

In addition, although the remote controller 5 performs the drive, it is possible to adopt another structure in which an operating section is provided to the flat display device body, and the channel tuning operation or the driving operation of the display unit 1 by the driving part 3 is instructed when the operating section is operated.

According to the present invention described above as the embodiment, the operating voltage to be supplied to the motor is changed gradually when the drive of the rotation drive mechanism is started or stopped, so that the torque of the motor can be changed gradually. Therefore, the acceleration or deceleration of the rotation speed can be performed mildly. Therefore, the reaction that is generated by the start or the stop of the rotation of the display unit by the rotation drive mechanism can be suppressed, so that the swaying thereof can be reduced.

Note that the present invention is not limited to the flat television set described above as the embodiment, but it can also be applied to other flat display devices including a display device for reproducing images of a computer. Furthermore, the present invention can be applied to flat display devices of various types including a liquid crystal type, a plasma display type, a rear projection type, a thin CRT type, an organic electro luminescence (EL) type, a surface-conduction electron-emitter (SE) type or the like.

What is claimed is:

1. A flat display device comprising:
   a display unit having a screen for displaying images;
   a pedestal part for supporting the display unit;
   a joint part for connecting the pedestal part with the display unit;

a rotation drive mechanism provided to the joint part for rotating the display unit in the horizontal direction;

a motor for giving a rotation force to the rotation drive mechanism;

a motor driver for driving the motor by supplying an operating voltage to the motor; and an operating voltage control portion for controlling the operating voltage, the operating voltage control portion including an integrator circuit which supplies a bias voltage to the motor driver, wherein the operating voltage changes in accordance with a value of the bias voltage, the motor generates a torque corresponding to the operating voltage, the operating voltage control portion controls the operating voltage by controlling the value of the bias voltage such that, when the driving of the rotation drive mechanism is started, a predetermined DC voltage is supplied to the integrator circuit and thereby the bias voltage is increased gradually so that the torque is increased gradually and, when the driving of the rotation drive mechanism is stopped, a ground voltage is supplied to the integrator circuit and thereby the bias voltage is decreased gradually so that the torque is decreased gradually.

2. The flat display device according to claim 1, further comprising an infrared reception part for receiving an infrared signal from a remote controller that issues an instruction of an operation to the flat display device by using the infrared signal, wherein the start and the stop of driving the rotation drive mechanism is performed in accordance with the infrared signal.

3. The flat display device according to claim 1, wherein the operating voltage control portion generates a voltage switching signal for changing the operating voltage and controls the operating voltage by using the voltage switching signal.

4. The flat display device according to claim 1, further comprising a signal conversion circuit for converting the infrared signal received by the infrared reception part into a control signal, and a main control portion for analyzing the control signal so as to recognize that the remote controller has issued the instruction to start or stop the driving of the rotation drive mechanism.

5. The flat display device according to claim 1, wherein the integrator circuit includes a resistor and a capacitor of which one end is connected to the resistor and another end is grounded, wherein, when the DC voltage is supplied, a charging operation of the capacitor is performed and thereby the bias voltage is increased gradually, and when the ground voltage is supplied, a discharging operation of the capacitor is performed and thereby the bias voltage is decreased gradually.

6. A flat display device comprising:
a display unit having a screen for displaying images;
a pedestal part for supporting the display unit;
a joint part for connecting the pedestal part with the display unit;
a rotation drive mechanism provided to the joint part for rotating the display unit in the horizontal direction;
a motor for giving a rotation force to the rotation drive mechanism;
a motor driver for driving the motor by supplying an operating voltage to the motor;
an operating voltage control portion for controlling the operating voltage, wherein
the motor generates a torque corresponding to the operating voltage,
the operating voltage control portion performs the control so that the operating voltage is increased gradually so that the torque is increased gradually when the driving of the rotation drive mechanism is started while the operating voltage is decreased gradually so that the torque is decreased gradually when the driving of the rotation drive mechanism is stopped, and
wherein the motor driver includes a control terminal and changes the operating voltage in accordance with a signal that is supplied to the control terminal, and the operating voltage control portion controls the operating voltage by controlling the signal that is delivered to the control terminal.

7. A flat display device comprising:
a display unit having a screen for displaying images;
a pedestal part for supporting the display unit;
a joint part for connecting the pedestal part with the display unit;
a rotation drive mechanism provided to the joint part for rotating the display unit in the horizontal direction;
a motor for giving a rotation force to the rotation drive mechanism;
a motor driver for driving the motor by supplying an operating voltage to the motor;
an operating voltage control portion for controlling the operating voltage, wherein
the motor generates a torque corresponding to the operating voltage,
the operating voltage control portion performs the control so that the operating voltage is increased gradually so that the torque is increased gradually when the driving of the rotation drive mechanism is started while the operating voltage is decreased gradually so that the torque is decreased gradually when the driving of the rotation drive mechanism is stopped, and
wherein the operating voltage control portion includes a digital to analog conversion circuit and converts a digital signal for instructing the operating voltage into an analog signal by the digital to analog conversion circuit, which is supplied to the motor driver.

\* \* \* \* \*